May 29, 1956 C. S. STUCKENHOLT 2,747,830
VALVE
Filed June 22, 1951
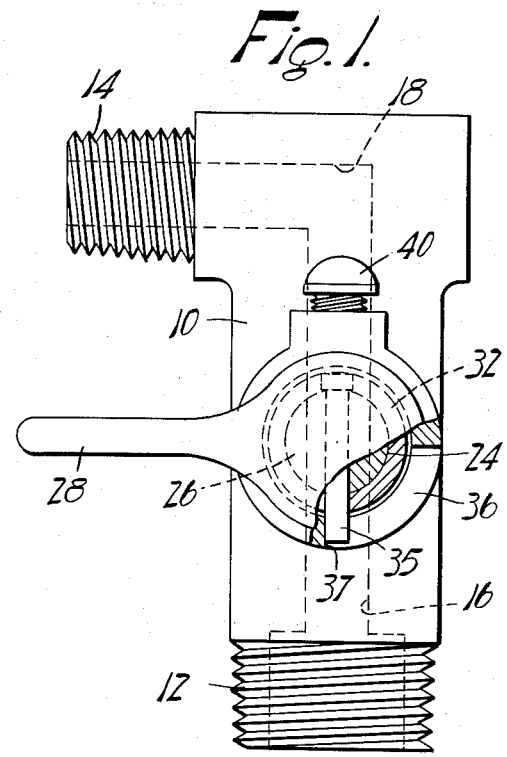
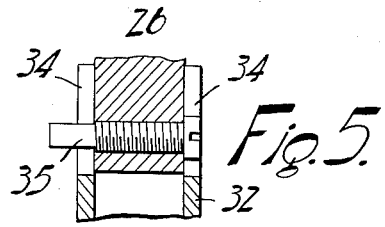
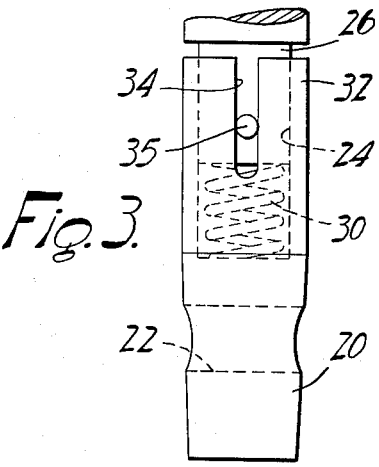
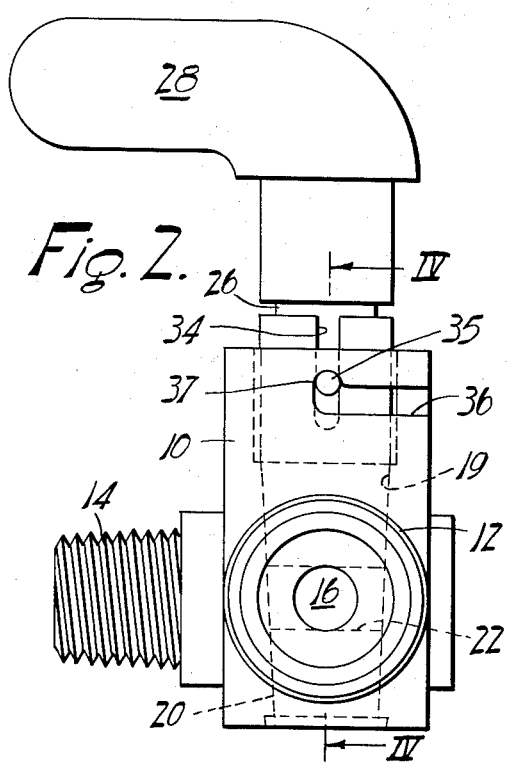
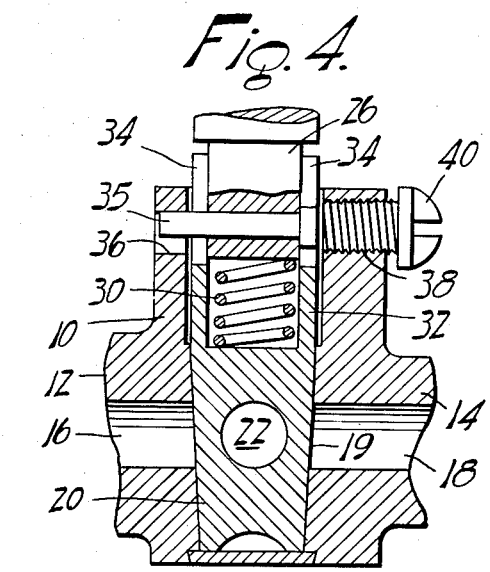
INVENTOR.
Casper S. Stuckenholt
BY
Bean, Brooks, Buckley & Bean
ATTORNEYS United States Patent Office 2,747,830
Patented May 29, 1956

2,747,830

VALVE

Casper S. Stuckenholt, Cleveland, Ohio, assignor to The W. J. Schoenberger Co., Cleveland, Ohio Application June 22, 1951, Serial No. 232,926

3 Claims. (Cl. 251—97)

This invention relates to gas valves, and more particularly to rotary plug type gas flow control valves of the type presently used in connection with domestic or industrial heating or cooking equipment or the like.

An object of the present invention is to provide a valve of the aforesaid type which embodies improved structural features and an improved safety lock arrangement preventing accidental opening of the valve. Another object of the invention is to provide a valve as aforesaid which is of improved construction whereby to facilitate manufacture and assembly of the component parts in improved manner. Other objects and advantages of the invention will appear from the specification hereinafter.

In the drawing:

Fig. 1 is a side elevation, with portions broken away to show part of the interior, of a valve of the invention;

Fig. 2 is a bottom elevation of the valve of Fig. 1;

Fig. 3 is fragmentary illustration of the valve plug and control stem portion of the device of Figs. 1–2, disassembled from the other components thereof;

Fig. 4 is a fragmentary section taken along line IV—IV of Fig. 2;

Fig. 5 is a fragmentary illustration of a modified arrangement for mounting the locking pin device in the valve control stem;

In Figs. 1–4 of the drawing the invention is illustrated as being embodied in a manually controlled valve of the rotary plug type such as is adapted particularly to domestic or commercial heating or cooking appliance control purposes; the valve device being illustrated to comprise a body portion 10; the inlet port portion of which comprises a threaded nipple 12 and the gas outlet port portion of which comprises a threaded nipple 14. The body portion 10 is internally bored as indicated at 16—18 to provide a gas flow passage through the valve body from the inlet to the outlet port; and an intermediate portion of the valve body 10 is transversely conically bored as indicated at 19 (Figs. 2 and 4) to accommodate in close fittings relation therein a similarly tapered portion of the valve plug 20. The plug 20 is transversely bored as indicated at 22 so that whenever the plug is disposed in the body at one position of angular adjustment therein, the bored passageways 16, 18, 22 will be in communicating alignment to permit flow of gas from the inlet to the outlet portions of the valve device; whereas if the plug is turned away therefrom as shown in Fig. 4 the passageway between the inlet and outlet ports will be blocked and the valve is in closed or "off" position.

As illustrated in Figs. 3–4, the plug member 20 is counterbored at one end thereof as indicated at 24 to receive in freely slip-fitting relation therein the inner end portion of a stem 26 extending from the valve control handle 28. The bored portion 24 of the plug 20 and the stem portion 26 of the control handle are so dimensioned as to provide space within the bored portion of the plug to accommodate a compression spring 30 arranged to bias the control stem outwardly of the plug bore. The cylindrical wall portion 32 of the plug 20 is slotted at diametrically opposed positions as indicated at 34—34 to accommodate in free sliding relation therein a locking pin 35 which is illustrated as being press-fitted through a transversely bored portion of the inner end of the stem 26. Thus, the pin 35 is mounted integrally with the stem 26, and the head and tail end portions of the pin extend into the slotted portions 34 of the plug so that rotation of the control handle 28 will provide similar rotation of the plug 20.

As shown in Figs. 1, 2 and 4, the body portion 10 of the valve device is formed with a collar portion in which is formed a bayonet slot formation 36 extending concentrically of the axis of plug rotation and throughout a 90° segment of the valve body. The tail end of the locking pin 35 is dimensioned to extend beyond the plug wall 32 and into the bayonet slot portion 36 of the body member; the pin 35 and the slot 36 being relatively dimensioned so as to permit the pin to rotate freely within the slot 36. The bayonet slot includes a concentric segmental portion and an upturned end portion 37 (Fig. 2) which is adapted to receive the extending end of the pin 35 in response to outwardly biasing pressures of the compression spring 30 for retaining the plug against rotation relative to the body of the valve. Also, the bayonet slot portions 36—37 are so positioned on the valve body collar that when the device is in assembled condition as illustrated in the drawing the bayonet slot device biases the pin 35 and the accompanying handle stem inwardly against the force of the spring 30 thereby compressing the latter. Consequently, whenever the valve handle 28 is turned to "off" position as illustrated in Figs. 2 and 4, the spring 30 acts to press the control stem outwardly so that the locking pin 35 is thereby disposed in the upturned end portion 37 of the bayonet slot; thereby "locking" the control handle in "off" position.

Thus, when the valve is turned to "off" position, the pin 35 cooperates with the slot portion 37 to maintain the control handle against accidental rotation toward "on" position, but the handle 28 may be readily actuated by first pressing against it so as to first displace the handle stem inwardly against the action of the spring 30 to free the pin 35 from the slot portion 37, whereupon the control handle 28 may then be rotated toward valve "on" position while the pin 35 rides within the flat segmental portion of the slot 36. Then, upon subsequent return of the control handle to "off" position, the spring 30 operates to automatically bias the control handle into locked position against subsequent accidental displacement therefrom.

To permit assembly of the locking pin 35 in the plug and stem and body portions of the valve device, the valve body is apertured as indicated at 38 so that the locking pin 35 may be inserted therethrough and into the assembled position thereof shown in Fig. 4. Also, as shown in Fig. 4, the aperture 38 may if preferred be provided with a suitable closure device to prevent accidental retraction of the locking pin through the aperture 38. Thus, for example, the aperture may be threaded to receive a cap screw as indicated at 40 which would then function to plug the aperture subsequent to assembly of the device; the head portion of the pin 35 serving in any case to prevent the pin from accidentally moving endwise in the direction of the tail end portion of the pin so as to thereby become disengaged. Or, as a possible alternative as illustrated in Fig. 5, the locking pin may be externally threaded for cooperation with a suitably threaded portion of the stem member so that when the locking pin is inserted through the aperture 38 it may be screwed into the stem member so as to thereby become firmly positioned thereon against accidental displacement, in which case the plug screw 40 need not be employed.

Thus, it will be appreciated that by virtue of the specific arrangement and construction of the parts of the valve of the invention, a unique and simplified valve construction is provided wherein a relatively telescopic plug and control stem device having therebetween a spring tending to bias the parts apart, is readily insertable within the valve body and thereupon locked therein by means of a simple pin device which cooperates at an extending end portion thereof with a novel slot formation in the valve body so as to thereupon maintain the plug and stem parts in assembled relation to the body while at the same time causing the spring disposed therebetween to exert forces transmitted against the valve body in such manner as to bias the valve plug inwardly into tight gas-sealing relation with the valve body. Furthermore, the cooperating locking pin and slot device functions at the same time to provide a unique locking arrangement holding the valve control handle against accidental displacement from valve "off" position; the forces of the same spring being employed to automatically shift the valve stem and the locking pin into a locked position relative to the valve body while at the same time maintaining the valve plug in firmly seated relation in the valve body.

Thus, it will be appreciated that the invention contemplates a novel automatic valve locking action for improved safety; the action being accomplished by means of simplified and relatively easily and inexpensively manufactured parts; and it will also be appreciated that whereas only a few forms of the invention have been shown and described in detail the invention is not so limited but that various changes may be made therein without departing from the spirit of the invention or the scope of the appended claims.

I claim:
1. In a rotary plug type valve, a body portion, a rotary plug fitted into said body portion and rotatable therein between valve "off" and "on" positions, a valve actuating stem telescopically fitted to said plug, a shouldered locking pin carried by said stem and having a portion extending into lost motion connection with said plug, a spring arranged to bias said plug and stem apart, said valve body including a collar portion adjacent said plug having a recess formed therein generally concentric of the axis of rotation of said plug and including a lateral branch portion, one end portion of said locking pin being dimensioned to extend into said recess, said locking pin having a shouldered portion bearing against one of the telescopically fitted parts of said stem and plug to prevent retraction of said pin from said stem through said recess, whereby upon rotation of said plug to valve "off" position said spring biases said pin member into the lateral branch portion of said recess thereby locking said stem against rotation relative to said body member and whereby said stem may be manually displaced against the action of said spring so as to release said pin from the lateral branch portion of said recess whereupon said stem may be rotated to turn said valve plug to valve "open" position, said body collar portion having an aperture therethrough whereby the pin may be inserted through said aperture during assembly of the device, and a closure device arranged in conjunction with said aperture for blocking the latter against accidental retraction of said pin from said plug through said aperture.

2. In a rotary plug type valve, a body portion, a rotary plug fitted into said body portion and rotatable therein between "off" and "on" positions, said plug being counterbored axially thereof, a compression spring disposed within said counterbored portion, a valve actuating stem slip-fitted into said counterbored portion, the wall portion of said plug member in the region of said counterbore being longitudinally slotted at diametrically opposed positions from the outer end thereof, a shouldered locking pin mounted upon said stem and having its opposite end portions extending into the slotted portions of said plug, said valve body including a collar portion encircling said plug in the region of the counterbored portion thereof and having a transverse bayonet slot formed through a wall portion thereof, the tail end portion of said locking pin being dimensioned to extend into said bayonet slot, the shouldered portion of said pin bearing against said stem to prevent passage of said pin through said bayonet slot, said spring disposed and arranged to exert pressure against said stem and thence through said pin and thence against said body collar portion when the device is assembled so as to thereby bias said plug inwardly into said body member for fluid sealing operation, whereby upon rotation of said plug to valve "off" position said spring biases said stem and pin members into the locking end portion of said bayonet slot thereby locking said stem against rotation relative to said body member and whereby said stem may be manually depressed against the action of said spring so as to release said pin from the locking portion of said bayonet slot whereupon said stem may be rotated to turn said valve plug to valve open position, said body collar portion having an aperture therethrough opposite said bayonet slot whereby the pin may be inserted through said aperture during assembly of the device.

3. In a rotary plug type valve, a body portion, a rotary plug fitted into said body portion and rotatable between valve "off" and "on" positions, said plug being counterbored axially thereof, a compression spring disposed within said counterbored portion, a valve actuating stem slip-fitted into said counterbored portion, the wall portion of said plug member in the region of said counterbore being longitudinally slotted from the outer end thereof, a shouldered locking pin carried by said stem and having an end portion extending into the slotted portion of said plug, said valve body including a portion adjacent said plug having a slot formed therein concentric of the axis of rotation of said plug and including a lateral branch slot portion, one end portion of said locking pin being dimensioned to extend into said slot, the shoulder of said pin bearing against one of said stem and plug to prevent passage of said pin through said slot whereby upon rotation of said plug to valve "off" position said spring biases said pin member into the lateral branch portion of said slot thereby locking said stem against rotation relative to said body member and whereby said stem may be manually displaced against the action of said spring so as to release said pin from the lateral branch portion of said slot whereupon said stem may be rotated to turn said valve plug to valve "open" position, said body collar portion having an aperture therethrough adapted for registry with the other end portion of said pin whereby the pin may be inserted through said aperture during assembly of the device.

References Cited in the file of this patent

UNITED STATES PATENTS

| | | |
|---|---|---|
| 865,216 | Ullman | Sept. 3, 1907 |
| 1,667,525 | Bashcongi | Apr. 24, 1928 |
| 1,757,550 | Smith | May 6, 1930 |
| 1,787,488 | McSpedon | Jan. 6, 1931 |
| 1,920,511 | Kulicke | Aug. 1, 1933 |
| 1,982,101 | Herbster | Nov. 27, 1934 |
| 2,111,998 | Stuckenholt | Mar. 22, 1938 |
| 2,118,232 | Roberts | May 24, 1938 |
| 2,236,009 | Rutherford | Mar. 25, 1941 |
| 2,253,643 | Mueller | Aug. 26, 1941 |
| 2,276,271 | Harper | Mar. 17, 1942 |

FOREIGN PATENTS

| | | |
|---|---|---|
| 13,365 | Great Britain | June 2, 1910 |
| 214,781 | Great Britain | May 1, 1924 |
| 442,055 | Great Britain | Jan. 31, 1936 |
| 502,691 | Great Britain | of 1939 |
| 66,452 | Denmark | Mar. 22, 1948 |
| 96,641 | Sweden | Aug. 29, 1939 |
| 123,310 | Sweden | Nov. 16, 1948 |
| 761,034 | France | of 1934 |